(12) United States Patent
Hattori

(10) Patent No.: US 11,827,764 B2
(45) Date of Patent: Nov. 28, 2023

(54) COMPLEX STRUCTURE MATERIAL, RESIN COMPONENT, METHOD OF PRODUCING RESIN COMPONENT

(71) Applicant: TOYOTA BOSHOKU KABUSHIKI KAISHA, Aichi-ken (JP)

(72) Inventor: Atsuhiro Hattori, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 477 days.

(21) Appl. No.: 17/086,936

(22) Filed: Nov. 2, 2020

(65) Prior Publication Data
US 2021/0047491 A1 Feb. 18, 2021

Related U.S. Application Data

(62) Division of application No. 16/190,416, filed on Nov. 14, 2018, now abandoned.

(30) Foreign Application Priority Data

Nov. 24, 2017 (JP) .................................. 2017-225471

(51) Int. Cl.
*C08J 9/42* (2006.01)
*B29C 43/00* (2006.01)
(Continued)

(52) U.S. Cl.
CPC ............... *C08J 9/42* (2013.01); *B29C 43/003* (2013.01); *B29C 43/02* (2013.01); *B29C 43/021* (2013.01);
(Continued)

(58) Field of Classification Search
CPC ....... C08J 9/42; C08J 2205/04; B29C 43/003; B29C 43/02; B29C 43/021;
(Continued)

(56) References Cited

U.S. PATENT DOCUMENTS

| 3,306,967 A | 2/1967 | Turkewitsch |
| 3,867,221 A | 2/1975 | Chant |
| 4,239,571 A | 12/1980 | Cobb |
| 5,721,035 A | 2/1998 | Dunn |

(Continued)

FOREIGN PATENT DOCUMENTS

| DE | 69723943 T2 | 6/2004 |
| DE | 102016111284 | 12/2017 |

(Continued)

OTHER PUBLICATIONS

DE Office Action issued in DE Patent Application No. 10 2018 129 444.1, dated Jan. 15, 2021, English translation.
Office Action issued in JP Patent Application No. 2017-225471, dated Jun. 22, 2021, English translation.

*Primary Examiner* — Stella K Yi
(74) *Attorney, Agent, or Firm* — GREENBLUM & BERNSTEIN, P.L.C.

(57) ABSTRACT

A complex structure material includes a foam made of thermosetting resin and coverings made of thermoplastic resin. The foam includes a matrix and pores. At least some of the pores communicate with each other. The foam has a continuous porous structure formed by the matrix and the pores. The coverings cover inner walls of the pores in the foam.

6 Claims, 5 Drawing Sheets

(51) Int. Cl.
  *B29C 43/20* (2006.01)
  *B29C 43/02* (2006.01)
  *B29K 105/04* (2006.01)
  *B29K 75/00* (2006.01)
  *B29C 43/52* (2006.01)

(52) U.S. Cl.
  CPC ............ *B29C 43/203* (2013.01); *B29C 43/52* (2013.01); *B29K 2075/00* (2013.01); *B29K 2105/04* (2013.01); *C08J 2205/04* (2013.01); *C08J 2205/06* (2013.01); *C08J 2375/04* (2013.01)

(58) Field of Classification Search
  CPC .......... B29C 2045/14803; B29C 67/20; B29C 44/00; B29C 44/005; B29C 45/14795
  See application file for complete search history.

(56) References Cited

U.S. PATENT DOCUMENTS

| | | | |
|---|---|---|---|
| 6,316,088 B1* | 11/2001 | Ogawa | C09J 11/08 |
| | | | 428/297.4 |
| 2002/0043736 A1* | 4/2002 | Murakami | F02B 77/13 |
| | | | 428/319.3 |
| 2004/0164499 A1 | 8/2004 | Murakami et al. | |
| 2012/0276339 A1 | 11/2012 | Pearce | |

FOREIGN PATENT DOCUMENTS

| | | |
|---|---|---|
| JP | S59-045130 | 3/1984 |
| JP | S61-004741 | 1/1986 |
| JP | S61-252239 | 11/1986 |
| JP | H07-144333 | 6/1995 |
| JP | 2002-069228 | 3/2002 |

* cited by examiner

COMPLEX STRUCTURE MATERIAL, RESIN COMPONENT, METHOD OF PRODUCING RESIN COMPONENT

CROSS REFERENCE TO RELATED APPLICATION

This application is a Divisional application of U.S. application Ser. No. 16/190,416 filed Nov. 14, 2018, which claims priority from Japanese Patent Application No. 2017-225471 filed on Nov. 24, 2017. The entire contents of the priority application are incorporated herein by reference.

TECHNICAL FIELD

The technology described herein relates to a complex structure material, a resin component, and a method of producing the resin component.

BACKGROUND

A method for efficiently and evenly impregnating a foam in with an impregnation agent, which may be a thermosetting resin agent or an impregnation agent selected based on a predefined purpose, includes: holding a mesh board in the impregnation agent; disposing at least a section of a form including an impregnation surface in the impregnation agent; pressing the foam against the mesh board; and releasing the foam such that the foam returns to its original state. According to the method, the foam evenly absorbs the impregnation agent.

Technologies for preparing foams from thermosetting resin such as urethane foams and in predefined shapes include injection foaming, cutting, and hot-pressing. The injection foaming includes injecting a urethane material into a mold and foaming the urethane material. The cutting includes cutting a foamed-urethane slab that is foamed in advance into a predefined shape. The hot-pressing includes compressing a foamed-urethane slab that is foamed in advance and thermoset-molding the foamed-urethane slab while the foamed-urethane slab remains compressed.

In the injection foaming, it may take a while for foaming and curing the foam. Furthermore, the injection foaming may require large scale equipment. In the cutting, cutting of the foam into a complicated shape may be difficult. In the hot-pressing, preparation of a hard foam may be difficult. Furthermore, in shaping of a soft form, shapes to be formed through the hot-pressing are limited. Still furthermore, it may take a while for increasing the temperature of the foam and hot-pressing may require large-scale equipment.

SUMMARY

The technology described herein was made in view of the foregoing circumstances. An object is to provide a technology for producing a resin component having air permeability and sound absorbability with higher productivity and higher flexibility in shape design of the resin component is provided.

A complex structure material according to the technology described herein includes a foam made of thermosetting resin and coverings made of thermoplastic resin. The foam includes a matrix and pores. At least some of the pores communicate with each other. The foam has a continuous porous structure formed by the matrix and the pores. The coverings cover inner walls of the pores in the foam. A resin component according to the technology described herein includes the complex structure material.

A method of producing a resin component according to the technology described herein incudes: preparing a foam made of thermosetting resin and including a matrix and pores, at least some of the pores communicating with each other, the foam having a continuous porous structure formed by the matrix and the pores; covering inner walls of the pores with a thermoplastic resin to form a complex structure material; heating the complex structure material to a temperature at which the thermoplastic resin is softened or greater; and cold-pressing the complex structure material into a shape of the resin component.

Methods widely used for preparing foams from thermosetting resin include injection foaming, cutting, and hot-pressing. According to the technology described herein, the complex structure material is shaped by cold-pressing. The resin component according to the described herein can be prepared in a predefined shape using the characteristics of the thermoplastic resin and without using the methods described above. In comparison to preparing a foam from thermosetting resin, the productivity and the flexibility in shape design of the resin component according to the technology described herein improve. The resin component that includes the foam made of thermosetting resin is more likely to maintain the continuous porous structure after hot forming and pressing under specific conditions. The resin component has air permeability and sound absorbability. Namely, a technology for forming a resin component having air permeability and sound absorbability with higher productivity and higher flexibility in shape design of the resin component is provided.

According to the technology described herein, a technology for producing a resin component having air permeability and sound absorbability with higher productivity and higher flexibility in shape design of the resin component is provided.

DETAILED DESCRIPTION

An embodiment will be described with reference to FIGS. 1 to 5. In this section, a complex structure material 20 from which a resin component 10 is prepared will be described. Applications of the resin component 10 include sound absorbers in vehicles.

Figure 1:
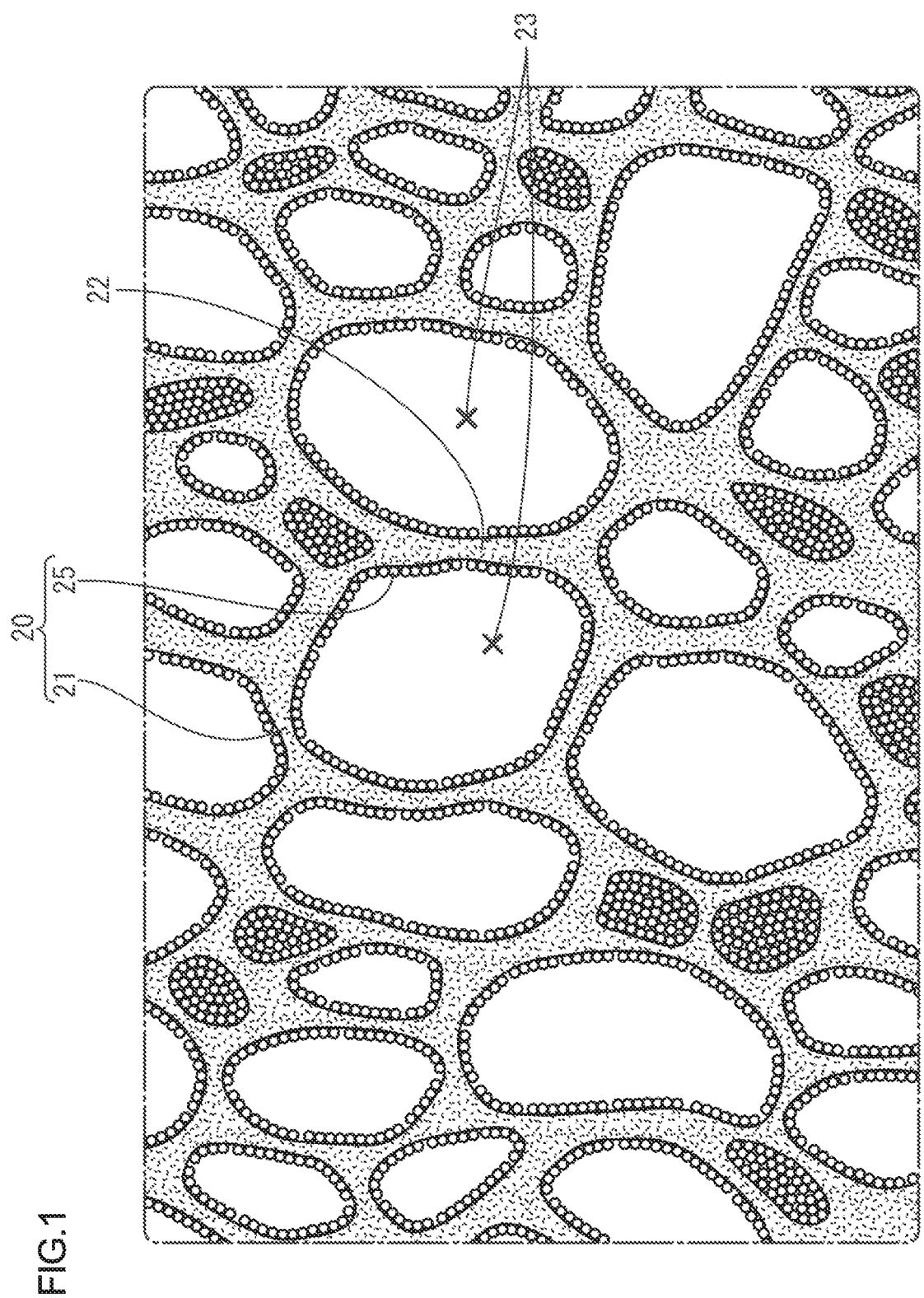
FIG. 1 is a schematic view illustrating a porous structure of a complex structure material according to an embodiment.

As illustrated in FIG. 1, the complex structure material 20 includes a foam 21 that is made of thermosetting resin and coverings 25 that are made of thermoplastic resin. The foam 21 includes a matrix 22 and pores 23, which may be referred to as cells. The matrix 22 has a three-dimensional matrix structure including sections that define the pores 23. At least some of the pores 23 communicate with each other to form communicating holes. In this description, a structure including the matrix 22 and the pores 23, at least some of which communicate with each other, is referred to as a continuous porous structure. The coverings 25 cover inner walls of the pores 23.

The complex structure material 20 has a restoration rate of 30% or less. The restoration rate is expressed by the following equation:

Restoration rate (%)=$(B-A/4)/(A-A/4) \times 100$, where A is a thickness of the complex structure material 20 in a natural state and B is a thickness of the complex structure material 20 in a state after heated to a temperature at which the thermoplastic resin is softened or greater, compressed to one fourth of A (A/4), and released after the thermoplastic resin is solidified.

The complex structure material 20 is configured such that a difference between the thickness B of the complex structure material 20 after recovered from the compression and ¼ of the thickness A of the complex structure material 20 (B−A/4) is 30% of a difference between the thickness A and ¼ of the thickness A (A−A/4) or lower in common cold-pressing conditions. For example, if A is 20 mm, B is 9.5 mm or less.

In this description, the cold-pressing is referred to as a process illustrated in FIG. 4, that is, forming dies 41 in a forming apparatus 40 are not heated and an object is pressed with the forming dies 41 at normal temperature. The restoration rate expressed by the above equation may be referred to as a restoration rate in cold-pressing (75% compression).

The foam 21 is a thermosetting resin foam such as a polyurethane foam and a melamine foam. A polyurethane foam is more preferable for the foam 21. A soft urethane foam is further more preferable in terms of flexibility and restorability. A soft urethane foam may be prepared by stimulating and forming a forming material including polyols, polyisocyanates, a forming agent, and a catalytic agent. The foam 21 is prepared by forming a forming material by an ordinary method and cutting out of a formed slab with predefined dimensions.

As illustrated in FIG. 1, the coverings 25 are thermoplastic resin layers formed on inner walls of the pores 23 to maintain the continuous porous structure of the foam 21 and to cover at least portions of the inner walls of the pores 23. When the continuous porous structure is maintained, the pores 23 are not filled with the thermoplastic resin and the pores 23 remain communicating with each other. The coverings 25 are thin films that are formed from a water-based emulsion dispersion to cover the inner walls of the pores 23. In FIG. 1, the coverings 25 are indicated by small circles for the purpose of illustration.

The thermoplastic resin may include at least one of rubbers in the synthetic rubber latex category such as styrene-butadiene rubber (SBR), and acrylonitrile-butadiene rubber (NBR), methyl-methacrylate-butadiene rubber (MBR), and copolymers in the synthetic resin emulsion category such as acrylonitrile-styrene copolymer (AS), polyethylene (PE), polypropylene (PP), and ethylene-vinyl-acetate copolymer (EVA). A resin or resins may be selected from the above examples based on properties including hardness, hardness, flexibility, and thermal characteristics including a glass-transition temperature Tg and a melting temperature Tm in view of a temperature in dry heating for forming the coverings 25, a temperature in heating for forming the resin component 10, and an upper temperature limit required for the resin component 10. A complex thermoplastic resin that is a mixture of the styrene-butadiene rubber having a relatively low glass-transition temperature Tg and flexibility and the acrylonitrile-styrene copolymer having a relatively high glass-transition temperature Tg and hardness may be preferable.

A content of the thermoplastic resin is defined based on adhesiveness of the thermoplastic resin and elasticity of the foam 21 so that the restoration rate of the complex structure material 20 in the cold-pressing (75% compression) is 30% or less. The restoration rate of the complex structure material 20 can be more easily reduced as the content of the thermoplastic resin is greater, that is, the resin component 10 has an advantage in formability. An apparent density of the complex structure material 20 or a mass of the resin component 10 increases as the content of the thermoplastic resin increases. By preparing the resin component 10 from a foamed slab having an apparent density less than that of a molded foam, the resin component 10 that includes a sufficient amount of the thermoplastic resin to obtain the restoration rate of 30% or less has a weight less than weights of common formed sound absorber prepared from molded foams or non-woven fabric.

Figure 2:
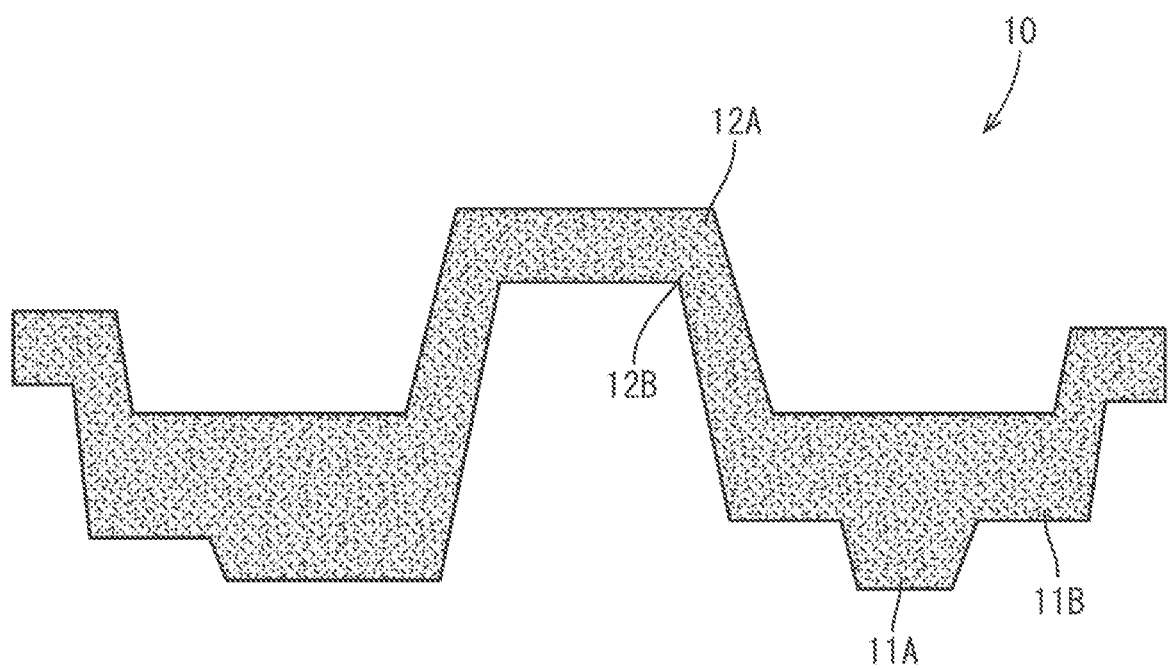
FIG. 2 is a side view of a resin component.

The resin component 10 is prepared from the complex structure material 20. The resin component 10 includes communicating holes in at least some sections. As illustrated in FIG. 2, the resin component 10 includes a first higher void ratio portion 11A and a second higher void ratio portion 12A that have relatively high void ratios and a first lower void ratio portion 11B and a second lower void ratio portion 12B that have relatively lower void ratios. The first higher void ratio portion 11A and the first lower void ratio portion 11B are arranged along a surface of the resin component 10. Compression ratios of the first higher void ratio portion 11A and the first lower void ratio portion 11B in the thickness direction of the complex structure material 20 (a direction in which the forming dies 41 are closed) are different from each other. The second higher void ratio portion 12A and the second lower void ratio portion 12B are an outer corner and an inner corner of a curved portion of the resin component 10. The second higher void ratio portion 12A and the second lower void ratio portion 12B are separated from each other in the thickness direction of the complex structure material 20. A difference in compression ratios is created between the second higher void ratio portion 12A and the second lower void ratio portion 12B due to a difference in length between the outer and the inner corners. In the first higher void ratio portion 11A and the second higher void ratio portion 12A, the communicating holes in the foam 21 are more likely to be maintained in comparison to the communicating holes in the first lower void ratio portion 11B and the second lower void ratio portion 12B. Namely, the first higher void ratio portion 11A and the second higher void ratio portion 12A contribute to the improvement in air permeability and sound absorbability. In the first lower void ratio portion 11B and the second lower void ratio portion 12B, the inner walls of the pores 23 are more likely to adhere to each other in comparison to the first higher void ratio portion 11A and the second higher void ratio portion 12A. With the first lower void ratio portion 11B and the second lower void ratio portion 12B, the resin component 10 maintains its shape.

The resin component 10 is to be disposed between a body panel and an interior component in a vehicle. As illustrated in FIG. 2, the resin component 10 is formed in a predefined shape along shapes of the body panel and the interior component to fit a space between the body panel and the interior component. The space is filled with the resin component 10 without any gaps so that the resin component 10 properly absorbs noises. Furthermore, because the resin component 10 is formed in the predefined shape, the resin component 10 is less likely to apply stress to other components. Therefore, assembly work is easier.

Next, a method of producing the resin component 10 will be described. The method of producing the resin component 10 includes a complex structure material forming process, a heating process, and a complex structure material shaping process. The complex structure material forming process is for forming the complex structure material 20. The heating process is for heating the complex structure material 20 to a temperature at which the thermoplastic resin is softened or greater. The complex structure material shaping process is for shaping the complex structure material 20 through cold-pressing to obtain the resin component 10.

In the complex structure material forming process, inner walls of the pores 23 (or surfaces of the matrix 22 in the pores 23) are covered with the thermoplastic resin. The complex structure material forming process includes an impregnating step, a squeezing step, and a drying step. The impregnating step includes impregnating the foam 21 with an emulsified dispersion 37 that is prepared by emulsifying and dispersing the thermoplastic resin. The drying step includes drying the foam 21 that is impregnated with the emulsified dispersion 37. The emulsified dispersion 37 is a water-based emulsified dispersion that is prepared by emulsifying and dispersing the thermoplastic resin in water.

Figure 3:
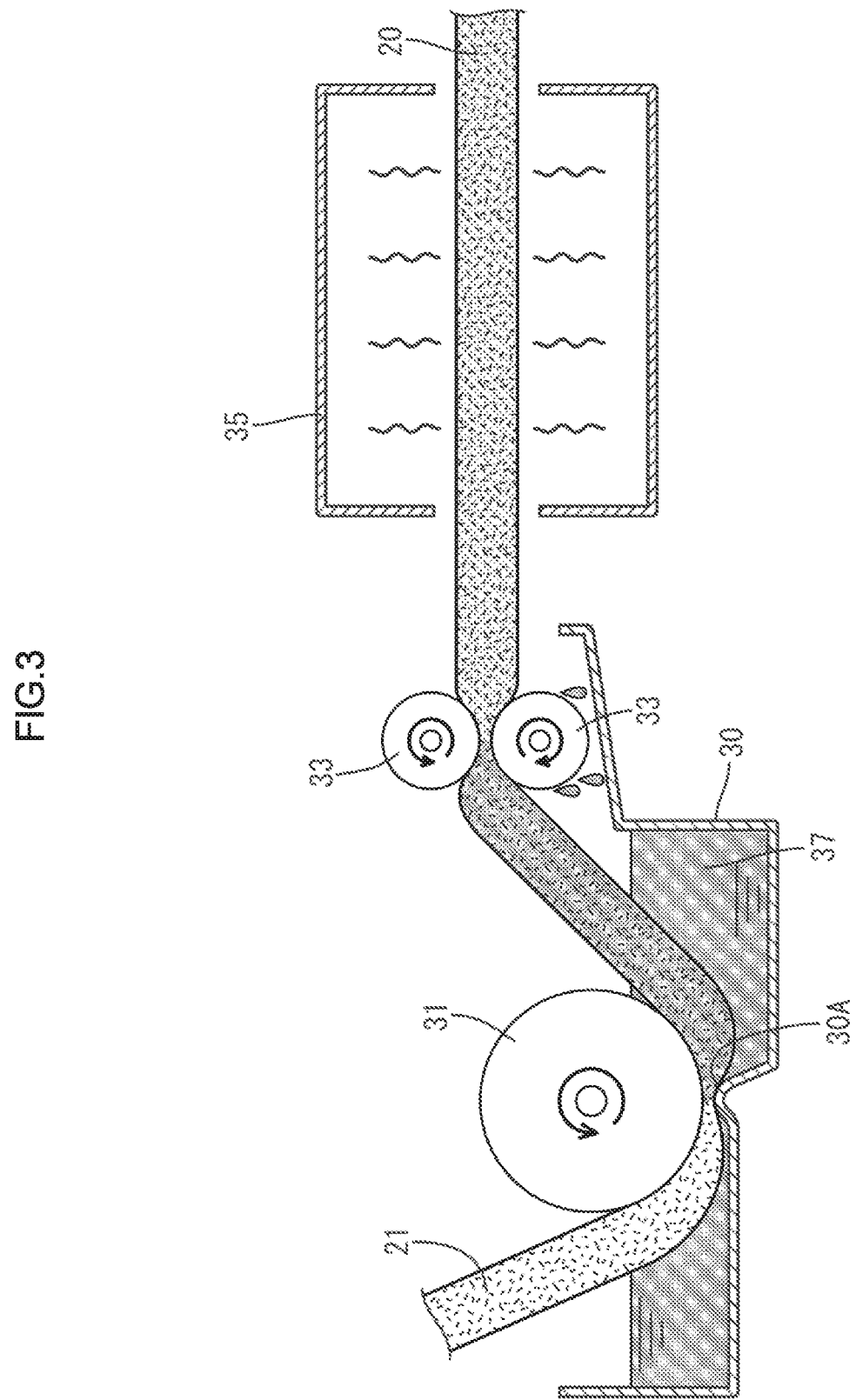
FIG. 3 is a view illustrating a complex structure material shaping process.

As illustrated in FIG. 3, a tank 30, a compression roller 31, squeeze rollers 33, and a heater 35 are disposed in line to transfer the foam 21 having an elongated shape in the complex structure material forming process. The tank 30 includes a protrusion 30A that protrudes from a bottom surface of the tank 30. The tank 30 holds the emulsified dispersion 37 therein. At least a part of the compression roller 31 is disposed in the emulsified dispersion 37 in the tank 30 to be opposed to the protrusion 30A and to sandwich the foam 21 between the protrusion 30A and the compression roller 31. The compression roller 31 compresses the foam 21 in a thickness direction of the foam 21 toward the protrusion 30A. The squeeze rollers 33 are disposed between the compression roller 31 and the heater 35. The squeeze rollers 33 are opposed to each other with a gap less than the thickness of the foam 21. The heater 35 includes a chamber with an entrance closer to the squeeze rollers 33 and an exit on an opposite side from the entrance. The heater 35 is configured to heat top and bottom surfaces of the foam 21 that is transferred through the chamber.

In the impregnating step, the foam 21 is transferred in a direction along the longitudinal direction of the foam 21 with the compression roller 31 as it rotates. The foam 21 is soaked and compressed in the emulsified dispersion 37 in the tank 30. As the foam 21 returns to its original state, the emulsified dispersion 37 is drawn into the pores 23 with the negative pressure and the pores 23 in the foam 21 are filled with the emulsified dispersion 37. In the communicating holes constructed from the pores 23, the emulsified dispersion 37 flows from the pores 23 closer to the outer surfaces of the foam 21 to the pores 23 in the inner side and thus the emulsified dispersion 37 permeates deeper portion of the foam 21.

In the squeezing step, the foam 21 is squeezed between the squeeze rollers 33 to remove an extra amount of the emulsified dispersion 37 from the foam 21 to adjust an amount of the emulsified dispersion 37 in the foam 21 so that the foam 21 contains a predefined amount of the thermoplastic resin. In the squeezing step, the emulsified dispersion 37 is evenly spread over the surfaces of the matrix 22. The foam 21 that contains the predefined amount of the emulsified dispersion 37 is transferred to the heater 35.

In the drying step, the foam 21 that contains the predefined amount of the emulsified dispersion 37 is heated at a predefined temperature for a predefined period while being passed through the chamber of the heater 35. In the foam 21, moisture evaporates from the emulsified dispersion 37 and the thermosetting resin is dried and solidified. As a result, the coverings 25 are formed. Through the complex structure material forming process, the complex structure material 20 including the foam 21 and the coverings 25 is prepared. The complex structure material 20 prepared through the complex structure material forming process may be cut into a proper shape for the shaping of the complex structure material 20 (e.g., a board shape, a block shape).

Figure 4A:
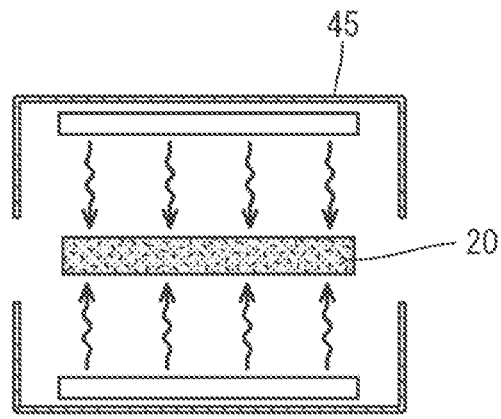
FIGS. 4A to 4D are views illustrating steps of the complex structure material shaping process.
Figure 4B:
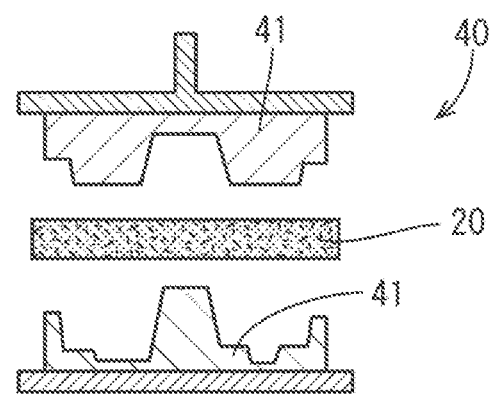
Figure 4C:
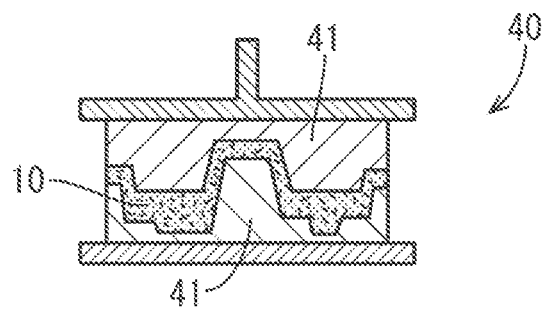
Figure 4D:
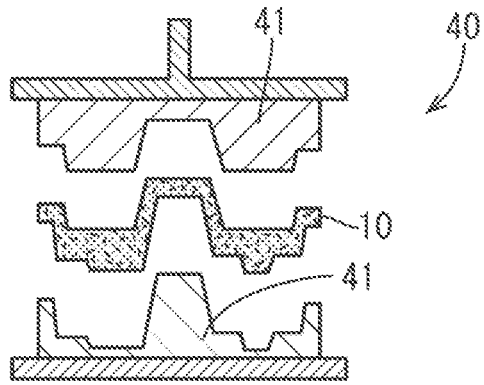

The complex structure material shaping process includes a heating step and a cold-pressing step. As illustrated in FIGS. 4A to 4D, a forming apparatus 40 is used for the complex structure material shaping process. The forming apparatus 40 includes a heater 45 and forming dies 41. As illustrated in FIG. 4A, the complex structure material 20 is heated in a camber of the heater 45 to a temperature at which the thermoplastic resin is softened or higher. As illustrated in FIG. 4B, the complex structure material 20 that is heated is placed between the forming dies 41. Then, the forming dies 41 are closed as illustrated in FIG. 4C. The complex structure material 20 is pressed by the forming dies 41 and shaped along a cavity defined by the forming dies 41. The forming dies 41 remain closed until the complex structure material 20 is cooled and solidified. In the foam 21, some of sections of the matrix 22 are bonded to each other with the thermoplastic resin to close the pores 23. The forming dies 41 are opened as illustrated in FIG. 4D. Through the complex structure material shaping process, the resin component 10 is prepared.

According to the method of producing the resin component 10 in this embodiment, the resin component 10 having the predefined shape is prepared through the cold-pressing utilizing the characteristics of the thermoplastic resin but not through the injection foaming, the cutting, or the hot-pressing that is a common method for forming the foam 21 from the thermosetting resin. In comparison to formation of the foam 21 from the thermosetting resin, productivity or flexibility in shape design of the resin component 10 improves. Furthermore, because the foam 21 is made of the thermosetting resin, the resin component 10 can maintain the continuous porous structure after the hot forming depending on conditions of the pressing. With the continuous porous structure, the resin component 10 has air permeability and sound absorbability. According to the method, the resin component 10 having the air permeability and the sound absorbability is prepared and a technology for improving the productivity and the flexibility in shape design of the resin component 10 is provided.

The method of producing the resin component utilizing the characteristics of the thermoplastic resin will be described by comparing the cold-pressing with other conventional methods. The injection forming has higher flexibility in shape design but takes longer time for curing the foam and higher cost for forming dies and facilities. In comparison to the injection forming, the cold-pressing has higher productivity in production of the resin component 10. Through the cutting, a hard foam can be only sliced. A soft foam may be cut into a more complicated shape in comparison to the hard form; however, the soft foam can be formed into a relatively simple and shallow shape through the cutting. To prepare a resin component in more complicated shape through the cutting, the larger number of times for cutting is required. In comparison to the cutting, the cold-pressing provides higher flexibility in shape design and higher productivity in formation of the resin component 10. If the hot-pressing is applied, sections of a matrix in a hard foam may collapse or break. Furthermore, it is difficult to deep-draw sections of a soft foam through the hot-pressing due to its high resilience. Still furthermore, it takes time to increase the temperature of the foam due to its thermal insulating properties and thus hot-pressing dies or equipment for heating the foam may cause an increase in production cost. In comparison to the hot-pressing, the cold-pressing provides higher flexibility in shape design and higher productivity in formation of the resin component 10.

In comparison to regular sound absorption foams such as molded foams and non-woven fabric sound absorption members, the weight of the resin component 10 constructed from the complex structure material 20 can be reduced. The foamed slab that is a general-purpose product is used for the foam 21 and thus a parts cost for the resin component 10 can be reduced.

By designing the characteristics of thermoplastic resin used for the coverings 25 as appropriate, characteristics including proper hardness, flame resistance, and additional sound absorption performances may be added to the resin component 10 in addition to the characteristics of the foam 21.

In this embodiment, the restoration rate of the complex structure material 20 in the cold-pressing (75% compression) is defined as 30% or less. Therefore, the shape of the resin component 10 is further less likely to be limited.

The foam 21 is the soft polyurethane foam. With the softness and the elasticity of the soft polyurethane foam, the resin component 10 can properly maintain the continuous porous structure and have the complex shape. Namely, the shape of the resin component 10 is further less likely to be limited.

In the complex structure material forming process, the foam 21 is soaked in the emulsified dispersion 37 and the foam 21 with the emulsified dispersion 37 therein is dried. Through the process, the inner walls of the pores 23 are covered with the thermoplastic resin while the continuous porous structure is maintained. Namely, the resin component 10 having improved air permeability and sound absorbability is prepared and the technology for improving the productivity and the flexibility in shape design of the resin component 10 is provided.

Practical Example

A practical example will be described. The technology described herein is not limited to the practical example.

1. Preparation of Test Specimens (an Example of the Complex Structure Member Forming Process)

(1) Preparation of Practical Example

Soft polyurethane foams having continuous porous structures were soaked in a water-based emulsion dispersion including thermoplastic resin and moisture in the water-based emulsion dispersion was evaporated. Through the processing, the soft polyurethane foams including matrixes, surfaces of which were covered with the thermoplastic resin, were prepared and defined as the test specimens of the practical example. Each of the soft polyurethane foams had a density of 28.9 kg/m3, a thickness of 20 mm, a hardness of 135 N at 25% compression (see JIS (Japanese Industrial Standards) K6400-2 method D), and a compression set of 2.5% (see JIS K6400-4 method A). The water-based emulsion dispersion included SBR having the relatively low glass-transition temperature Tg and AS having the relatively high glass-transition temperature Tg.

(2) Preparation of Comparative Example

Soft polyurethane foams having the same configuration as the soft polyurethane foams in the practical example were prepared as test specimens of the comparative example.

2. Resin Component Forming Process

Three test specimens of the practical example and three test specimens of the comparative example were pre-heated with a heater to 170° C. that was higher than the temperature at which the thermoplastic resin was softened. Then, each of the test specimens was set in a forming apparatus and cold-pressed until the thickness thereof was reduced to 5 mm. After the test specimen was cooled down to a predefined temperature (e.g., room temperature), the test specimen was removed from the forming device. The processing was performed on all of the test specimens and the three test specimens of the practical example and three test specimens of the comparative example ware obtained.

Figure 5:
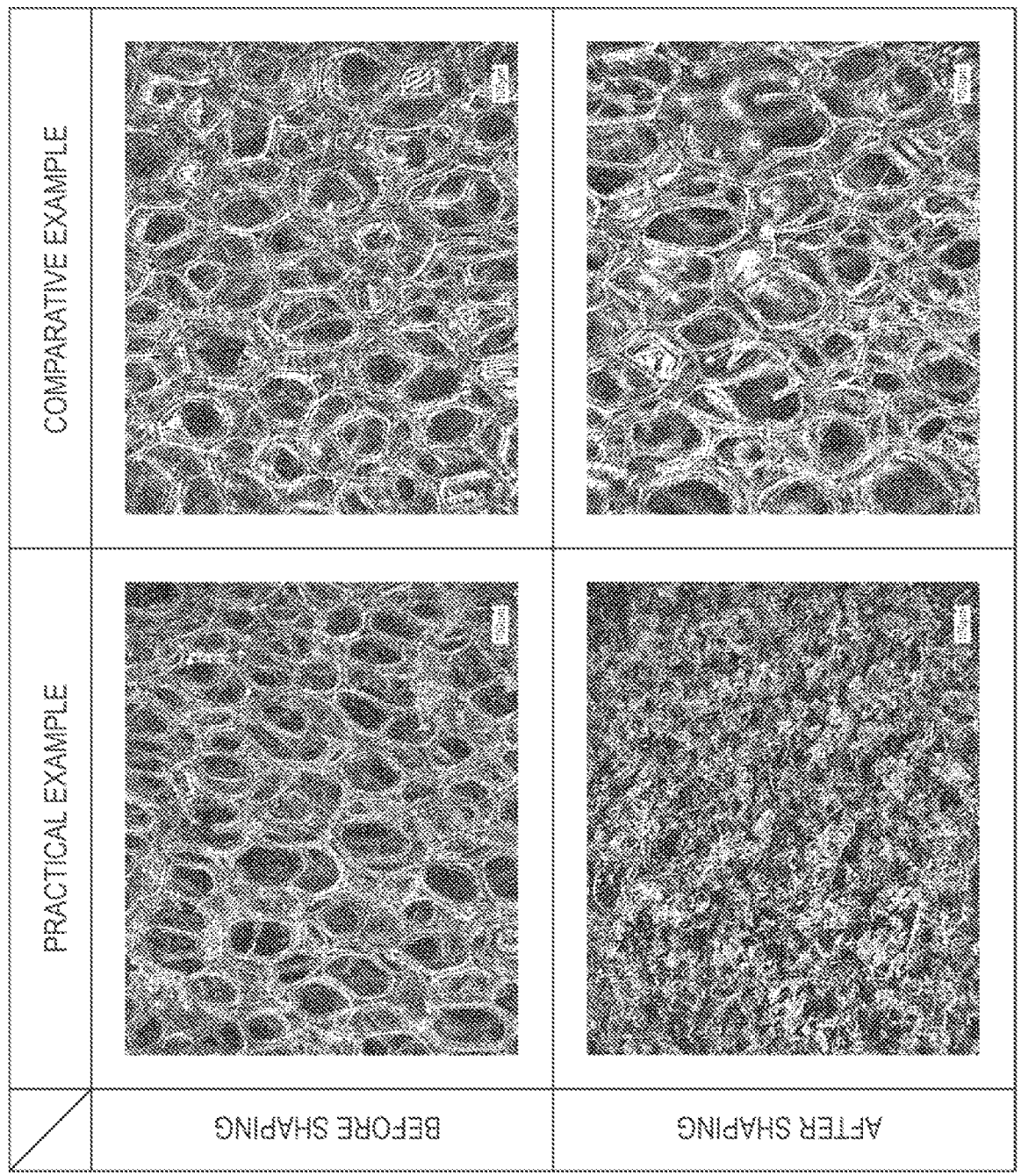
FIG. 5 is a table including micrographs of a practical example and a comparative example.

3. Evaluation of Practical Example and Comparative Example (1) Observation of Test Specimens Pieces of the test specimens were cut out before and after the complex structure material shaping process and observed using a microscope. FIG. 5 includes micrographs of the test specimens of the practical example and the comparative example before and after the shaping (before and after the complex structure material shaping processes. As illustrated in FIG. 5, the complex structure materials of the practical example maintain the continuous porous structures similar to those of the complex structure materials of the comparative example before the shaping. After the shaping, sections of the matrixes of the practical example are fixed to each other and a large number of the pores are closed whereas the pores of the comparative example are returned to substantially original states although some sections of the matrixes are broken.

(2) Calculation of Restoration Rate

Thicknesses of the test specimens of the practical example and the test specimens of the comparative example were measured and restoration rates after the cold-pressing (75% compression) were calculated, respectively. The thicknesses of the test specimens of the practical example were 5.0 mm, 5.0 mmm, and 5.0 mm, respectively. The calculated restoration rates of the test specimens of the practical example were all 0.0%. The thicknesses of the test specimens of the comparative example were 16.2 mm, 16.1 mm, and 14.6 mm, respectively. The calculated restoration rates of the test specimens of the comparative example were 74.7%, 74.0%, and 63.7%, respectively. From the results, it can be concluded that the resin components of the practical example are more easily shaped along the shapes of the forming dies and the formability of the resin components is improved in comparison to the resin components of the comparative example.

Other Embodiments

The technology described herein is not limited to the embodiment described in the above description and the drawings. The technology described herein may include the following embodiments.

(1) The technology described herein may be applied to a resin component that includes a matrix, surfaces of which are covered with fine particles made of thermoplastic resin adhering to the surfaces.

(2) The technology described herein may be applied to coverings provided only at portions of the foam pressed and deformed (lower void ratio portions).

(3) The technology described herein may be applied to resin components for seat cushions in vehicles or for building materials (e.g., insulating materials). The technology described herein may be applied to resin components including skin layers made of textile materials, leather materials, resin film materials, or other types of materials on surfaces of the resin components facing the interior of vehicles to improve decorative aspects. The technology described herein may be applied to resin components configured according to usage or installation positions and different from the configuration of the embodiment.

(4) The technology described herein may be applied to a method of producing a complex structure material including introducing fine particles made of thermoplastic resin into a foam through vibration.

(5) The technology described herein may be applied to resin components that are prepared by covering complex structure materials with sheets that do not have air permeability and formed together with the sheets through vacuum forming while thermoplastic resin softened.

The invention claimed is:

1. A method of producing a resin component, the method comprising:
    preparing a foam made of thermosetting resin and including a matrix and pores, at least some of the pores communicating with each other, the foam having a continuous porous structure formed by the matrix and the pores;
    covering inner walls of the pores with a thermoplastic resin to form a complex structure material;
    heating the complex structure material to a temperature at which the thermoplastic resin is softened or greater;
    cold-pressing the complex structure material into a shape of the resin component including pressing the complex structure material until the thickness of the complex structure material after heated is reduced to 25% of the thickness of the complex structure material in the natural state; and
    defining a content of the thermoplastic resin in the resin component based on adhesiveness of the thermoplastic resin and elasticity of the foam so that a restoration rate of the complex structure material is 30% or less using equation (1):

Restoration ratio $(\%)=(B-A/4)/(A-A/4)\times 100$  (1)

where A is a thickness of the complex structure material in a natural state, B is a thickness of the complex structure material after the complex structure material is heated to a temperature at which the thermoplastic resin is softened or greater, compressed until the thickness A becomes one fourth, and released after the thermoplastic resin is solidified,
    wherein the thermoplastic resin is a mixture of styrene-butadiene rubber and acrylonitrile-styrene copolymer.

2. The method according to claim 1, wherein the covering inner walls of the pores with a thermoplastic resin includes:
    emulsifying and dispersing the thermoplastic resin to prepare an emulsified dispersion;
    soaking the foam in the emulsified dispersion until the foam is impregnated with the emulsified dispersion; and
    drying the foam impregnated with the emulsified dispersion.

3. The method according to claim 1, wherein the cold-pressing the complex structure material comprising:
    placing the complex structure material that is heated between forming dies; and
    closing the forming dies to press the complex structure material to be shaped along a cavity defined by the forming dies corresponding to the shape of the resin component until the complex structure material is cooled and some of sections of the matrix bonded to each other with thermoplastic resin to close some of the pores.

4. A method of producing a resin component, the method comprising:
    forming a slab from a thermosetting resin forming material to have a continuous porous structure formed by a matrix and pores;
    cutting out the slab with predefined dimensions;
    emulsifying and dispersing the thermoplastic resin to prepare an emulsified dispersion;
    soaking the slab in the emulsified dispersion until the slab is impregnated with the emulsified dispersion;
    drying the slab impregnated with the emulsified dispersion to form a complex structure material;
    heating the complex structure material to a temperature at which the thermoplastic resin is softened or greater;
    cold-pressing the complex structure material into a shape of the resin component, comprising:
        placing the complex structure material that is heated between forming dies,
        closing the forming dies to press the complex structure material to be shaped along a cavity defined by the forming dies corresponding to the shape of the resin component until the complex structure material is cooled and some of sections of the matrix bonded to each other with thermoplastic resin to close some of the pores, and
        pressing the complex structure material until the thickness of the complex structure material after heated is reduced to 25% of the thickness of the complex structure material in the natural state;
    defining a content of the thermoplastic resin in the resin component based on adhesiveness of the thermoplastic resin and elasticity of the slab so that a restoration rate of the complex structure material is 30% or less using equation (1):

Restoration ratio $(\%)=(B-A/4)/(A-A/4)\times 100$  (1)

where A is a thickness of the complex structure material in a natural state, B is a thickness of the complex structure material after the complex structure material is heated to a temperature at which the thermoplastic resin is softened or greater, compressed until the thickness A becomes one fourth, and released after the thermoplastic resin is solidified,
    wherein the thermoplastic resin is a mixture of styrene-butadiene rubber and acrylonitrile-styrene copolymer.

5. The method according to claim 1,
    wherein the content of the thermoplastic resin in the resin component based on adhesiveness of the thermoplastic resin and elasticity of the foam is defined such that the restoration rate of the complex structure material is 0%.

6. The method according to claim 4,
    wherein the content of the thermoplastic resin in the resin component based on adhesiveness of the thermoplastic resin and elasticity of the slab is defined such that the restoration rate of the complex structure material is 0%.

* * * * *